US012606119B1

(12) United States Patent
Fischer et al.

(10) Patent No.: US 12,606,119 B1
(45) Date of Patent: Apr. 21, 2026

(54) FLOOR-MOUNTED OCCUPANT RESTRAINT SYSTEM

(71) Applicant: ZF Passive Safety Systems US LLC, Washington, MI (US)

(72) Inventors: Kurt Fischer, Rochester, MI (US); Douglas Gould, Lake Orion, MI (US)

(73) Assignee: ZF Passive Safety Systems US LLC, Washington, MI (US)

( * ) Notice: Subject to any disclaimer, the term of this patent is extended or adjusted under 35 U.S.C. 154(b) by 0 days.

(21) Appl. No.: 18/959,779

(22) Filed: Nov. 26, 2024

(51) Int. Cl.
B60R 21/2338 (2011.01)
B60R 21/214 (2011.01)

(52) U.S. Cl.
CPC ........ B60R 21/2338 (2013.01); B60R 21/214 (2013.01); *B60R 2021/23388* (2013.01)

(58) Field of Classification Search
CPC .............. B60R 21/214; B60R 21/2338; B60R 2021/23107; B60R 2021/23153; B60R 2021/23161; B60R 2021/23169; B60R 2021/23176; B60R 2021/23386; B60R 2021/23388
See application file for complete search history.

(56) References Cited

U.S. PATENT DOCUMENTS

| | | | | |
|---|---|---|---|---|
| 4,765,569 | A * | 8/1988 | Higgins | B60R 21/26 |
| | | | | 244/121 |
| 6,142,521 | A * | 11/2000 | Shephard | B60R 21/261 |
| | | | | 280/751 |
| 6,217,059 | B1 * | 4/2001 | Brown | B60R 21/16 |
| | | | | 280/730.2 |
| 7,090,245 | B2 * | 8/2006 | Yoshikawa | B60R 21/206 |
| | | | | 280/729 |
| 9,283,916 | B2 * | 3/2016 | Nagasawa | B60R 21/231 |
| 11,040,687 | B2 * | 6/2021 | Jayakar | B60R 21/214 |
| 11,059,449 | B2 * | 7/2021 | Jayakar | B60R 21/214 |
| 11,097,680 | B2 * | 8/2021 | Jayakar | B60R 21/232 |
| 11,148,629 | B2 * | 10/2021 | Sekizuka | B60R 21/231 |
| 11,279,311 | B2 * | 3/2022 | Schroeder | B60R 21/233 |
| 11,400,883 | B2 * | 8/2022 | Yamada | B60R 21/206 |
| 11,458,922 | B2 * | 10/2022 | Fischer | B60R 21/231 |
| 11,485,312 | B2 * | 11/2022 | Freisler | B60R 21/01554 |
| 11,498,509 | B2 * | 11/2022 | Fischer | B60R 21/261 |
| 11,535,185 | B2 * | 12/2022 | Fischer | B60R 21/239 |
| 11,897,409 | B2 * | 2/2024 | Gould | B60R 21/0136 |
| 2020/0062210 | A1 * | 2/2020 | Fukawatase | B60R 21/231 |
| 2022/0212622 | A1 * | 7/2022 | Gould | B60R 21/264 |
| 2025/0026302 | A1 * | 1/2025 | Iwama | B60R 21/233 |
| 2025/0222893 | A1 * | 7/2025 | Yamabe | B64D 11/0619 |

* cited by examiner

*Primary Examiner* — Laura Freedman
(74) *Attorney, Agent, or Firm* — Tarolli, Sundheim, Covell & Tummino LLP

(57) ABSTRACT

A restraint system for helping to protect an occupant of a vehicle having a floor, a roof, and a cabin with a seat for the occupant includes an airbag having a stored condition on the vehicle floor. The airbag is inflatable to a deployed condition aligned with the occupant in a forward-rearward direction of the vehicle and configured to receive a lower torso of an occupant penetrating into the airbag. At least one tether has a first end connected to the airbag and a second end connected to the vehicle floor for transmitting the energy of the occupant penetrating the airbag to the vehicle floor. At least one actuation unit connects the second end of each tether to the floor. The actuation unit is actuatable during deployment of the airbag to tension each tether for pulling the airbag towards the lower torso of the occupant.

24 Claims, 10 Drawing Sheets

FLOOR-MOUNTED OCCUPANT RESTRAINT SYSTEM

TECHNICAL FIELD

The present invention relates generally to vehicle airbags and, in particular, relates to floor-mounted airbags for helping to protect the lower torso of the occupant.

BACKGROUND

It is known to provide an inflatable vehicle occupant protection device, such as an airbag, for helping to protect an occupant of a vehicle. One particular type of airbag is a frontal airbag inflatable between an occupant of a front seat of the vehicle and an instrument panel of the vehicle. Such airbags may be driver airbags or passenger airbags. When inflated, the driver and passenger airbags help protect the occupant from impacts with parts of the vehicle such as the instrument panel and/or a steering wheel of the vehicle.

Passenger airbags are typically stored in a deflated condition in a housing that is mounted to the vehicle instrument panel. An airbag door is connectable with the housing and/or instrument panel to help enclose and conceal the airbag in a stored condition. Upon deployment of the passenger airbag, the airbag door opens to permit the airbag to move to an inflated condition. The airbag door opens as a result of forces exerted on the door by the inflating airbag.

Driver airbags are typically stored in a deflated condition in a housing that is mounted on the vehicle steering wheel. An airbag cover is connectable with the housing and/or steering wheel to help enclose and conceal the airbag in a stored condition. Upon deployment of the driver airbag, the airbag cover opens to permit the airbag to move to an inflated condition. The airbag cover opens as a result of forces exerted on the cover by the inflating driver airbag.

There are trends in the auto industry to make vehicles more spacious. Styling has been making the instrument panel smaller and thus farther away from the occupant. Looking further into the future, driverless, autonomous vehicles are even more spacious. Autonomous vehicles have been contemplated for some time, and now their adaption on a large scale is approaching. Autonomous vehicles can eliminate some of the structure.

With these realities as a backdrop, the paradigm of occupant safety systems must shift. In the past, the necessity of a vehicle operator/driver lent to a somewhat standard vehicle passenger cabin configuration. In the U.S., the driver is a front seat, left side, forward facing occupant within reach of the vehicle controls and instrumentation (steering wheel, pedals, instrument panel, console, etc.). This driver configuration helps dictate the layout of the remainder of the vehicle—front seat, forward-facing passenger-side occupant, rear seat (second row, third row, etc.) forward-facing occupants. Accordingly, in the past, occupant safety systems were typically designed with this passenger cabin layout and the associated occupant positions and orientations in mind.

The autonomous vehicle eliminates the operator/driver, which eliminates the necessity of their being positioned and oriented in the conventional manner. Vehicle manufacturers are free to utilize passenger cabin space as they see fit without being constrained to predetermined passenger arrangements, such as all forward-facing occupants, or vehicle structural configurations, such as steering wheel/ instrument panel configurations, center console configurations, foot well pedal controls, etc.

This presents the challenge of not only where to locate airbag systems, but also finding a reaction surface against which to position the airbag so that it can absorb impacts. Typically, instrument panel and steering wheel mounted frontal airbags utilize those structures as a reaction surface against which the airbag rests so that it can oppose, cushion, and absorb the impact energy of an impacting occupant and provide a desired ride-down effect. In the autonomous vehicles, however, the vehicle may not have an instrument panel or steering wheel at all, and the occupants can be positioned and oriented outside the traditional manner. This can make it difficult or impossible to utilize traditional structures in the vehicle as reaction surface.

SUMMARY

According to one aspect, a restraint system for helping to protect an occupant of a vehicle having a floor, a roof, and a cabin with a seat for the occupant includes an airbag having a stored condition on the vehicle floor. The airbag is inflatable to a deployed condition aligned with the occupant in a forward-rearward direction of the vehicle and configured to receive a lower torso of an occupant penetrating into the airbag. At least one tether has a first end connected to the airbag and a second end connected to the vehicle floor for transmitting the energy of the occupant penetrating the airbag to the vehicle floor. At least one actuation unit connects the second end of each tether to the floor. The actuation unit is actuatable during deployment of the airbag to tension each tether for pulling the airbag towards the lower torso of the occupant.

According to another aspect, a restraint system for helping to protect an occupant of a vehicle having a floor, a roof, and a cabin with a seat for the occupant includes a first airbag having a stored condition on the vehicle floor and being inflatable to a deployed condition aligned with the occupant in a forward-rearward direction of the vehicle and configured to receive a lower torso of an occupant penetrating into the airbag. First and second tethers each has a first end connected to the first airbag and a second end connected to the vehicle floor for transmitting the energy of the occupant penetrating the airbag to the vehicle floor. First and second actuation units connect the second ends of the first and second tethers to the floor. The first and second actuation units are actuatable during deployment of the first airbag to tension each tether for pulling the first airbag towards the lower torso of the occupant. A second airbag has a stored condition in a roof of the vehicle and is inflatable to a deployed condition between the first airbag and the occupant.

According to another aspect, taken alone or in combination with any other aspect, the at least one actuation unit is actuatable to move in a direction away from the airbag for pulling the airbag towards the lower torso.

According to another aspect, taken alone or in combination with any other aspect, the at least one actuation unit comprises a linear actuator having a first, retracted condition prior to airbag deployment and being actuatable to a second, extended condition during airbag deployment.

According to another aspect, taken alone or in combination with any other aspect, at least one tether has a first end connected to the airbag and a second end connected to the vehicle floor. The at least one tether is configured to transmit the energy of an occupant penetrating the airbag to the vehicle floor.

According to another aspect, taken alone or in combination with any other aspect, at least one guide element is provided on the floor for guiding each tether to each respective actuation unit.

According to another aspect, taken alone or in combination with any other aspect, a second airbag has a stored condition in the roof of the vehicle and is inflatable to a deployed condition between the airbag deployed from the vehicle floor and the occupant.

According to another aspect, taken alone or in combination with any other aspect, the at least one tether includes first and second tethers and a first and second actuation units. Each of the first and second tethers has the first end connected to the airbag and the second end connected to the respective first and second actuation units for transmitting the energy of the occupant penetrating the airbag to the vehicle floor.

According to another aspect, taken alone or in combination with any other aspect, the first and second actuation units are positioned on opposite sides of the seat.

According to another aspect, taken alone or in combination with any other aspect, the floor includes a toe board and the airbag is configured to deploy upwards and away from the toe board.

According to another aspect, taken alone or in combination with any other aspect, an actuator pivots the airbag from a first position within the floor prior to deployment to a second position located above the floor prior to actuation of the actuation units.

According to another aspect, taken alone or in combination with any other aspect, the airbag includes a portion configured to extend between feet of the occupant and the floor when the airbag is deployed.

According to another aspect, taken alone or in combination with any other aspect, a controller is provided for controlling actuation of the at least one actuation unit and deployment of the airbag.

According to another aspect, taken alone or in combination with any other aspect, an airbag module includes the restraint system, a housing configured to be mounted on the vehicle floor for storing the airbag, and an inflator positioned within the housing for providing inflation fluid for inflating the airbag.

Other objects and advantages and a fuller understanding of the invention will be had from the following detailed description and the accompanying drawings.

DETAILED DESCRIPTION

Figure 1:
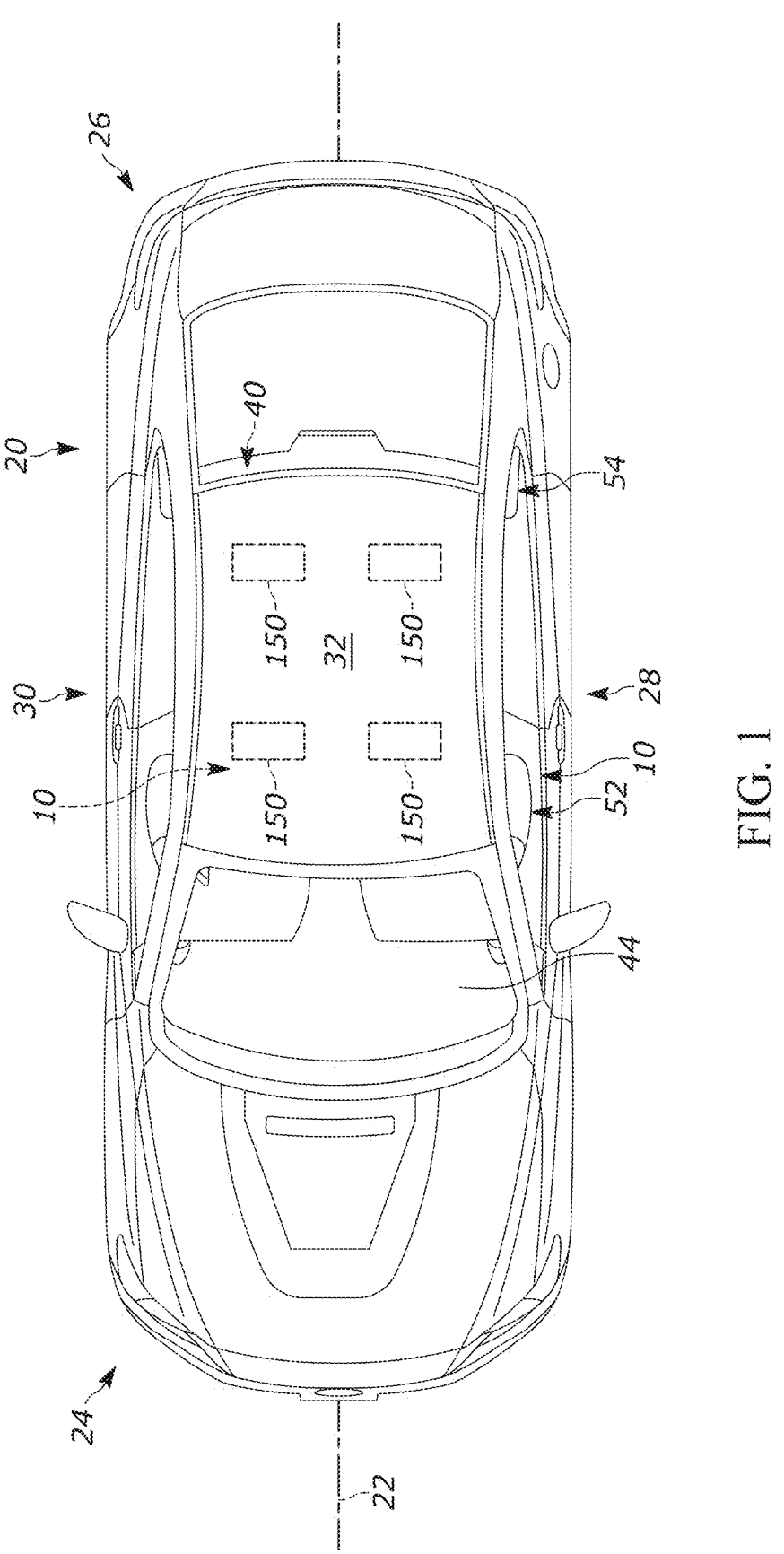
FIG. 1 is a top view of a vehicle including an example occupant restraint system including floor-mounted and roof-mounted airbags.
Figure 2:
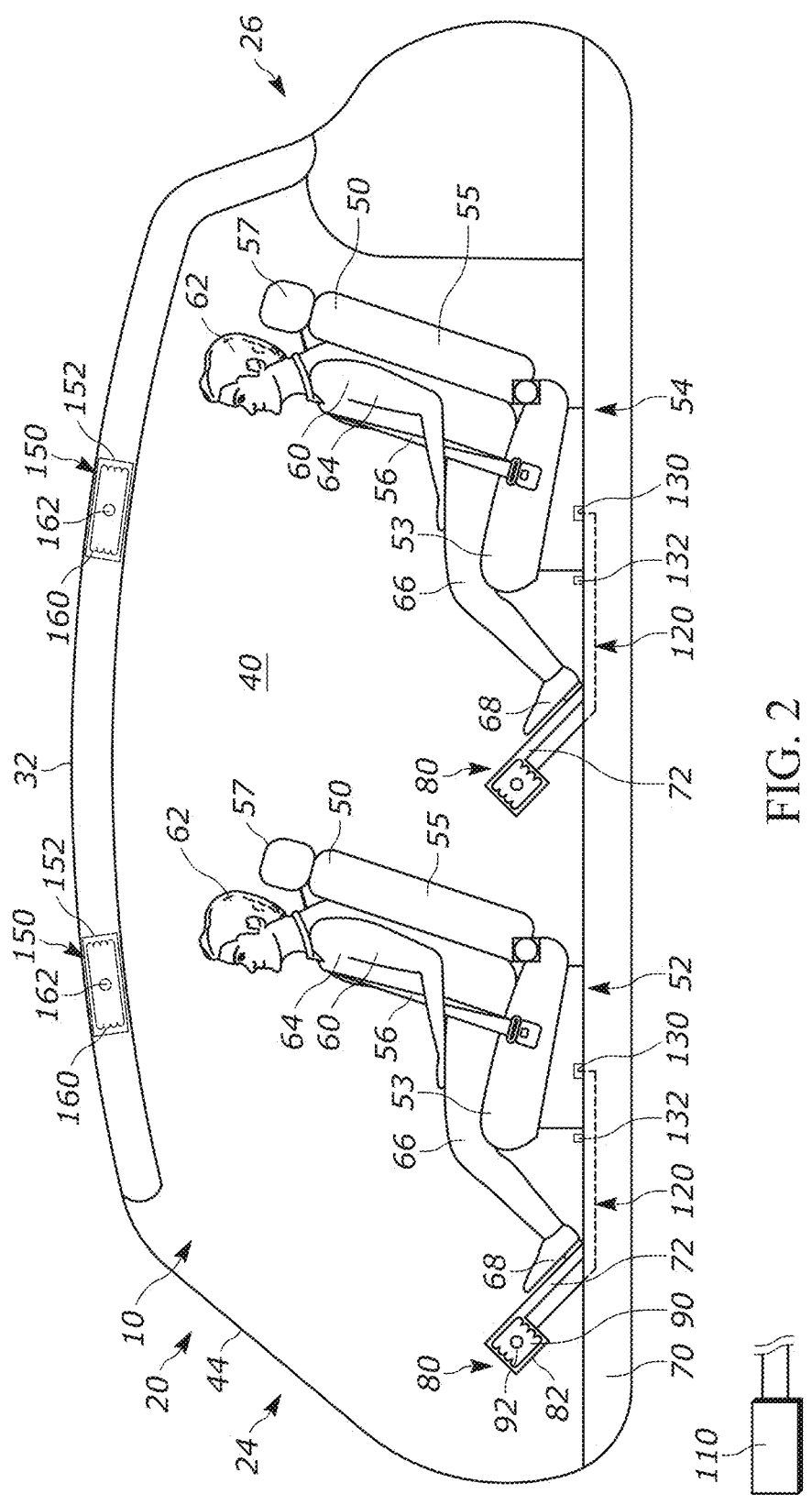
FIG. 2 is a schematic illustration of a cabin of the vehicle with a first seating arrangement and the airbags in a stored condition.

The present invention relates generally to vehicle airbags and, in particular, relates to floor-mounted airbags for helping to protect the lower torso of an occupant. FIGS. 1-2 illustrate an example vehicle safety system in the form of an occupant restraint system 10. The vehicle 20 extends along a centerline 22 from a first or fore end 24 to a second or aft end 26. The vehicle 20 extends to a left side 28 and a right side 30 on opposite sides of the centerline 22. A windshield or windscreen 44 can be located at the first end 24 and extend downward from the roof 32.

The vehicle 20 can be an autonomous vehicle, in which case the cabin 40 can be without operator controls, such as a steering wheel, pedals, instrumentation, center console, etc. Accordingly, the instrument panel typically provided in driven vehicles can be removed altogether in order to maximize the space in the cabin 40.

Figure 3:
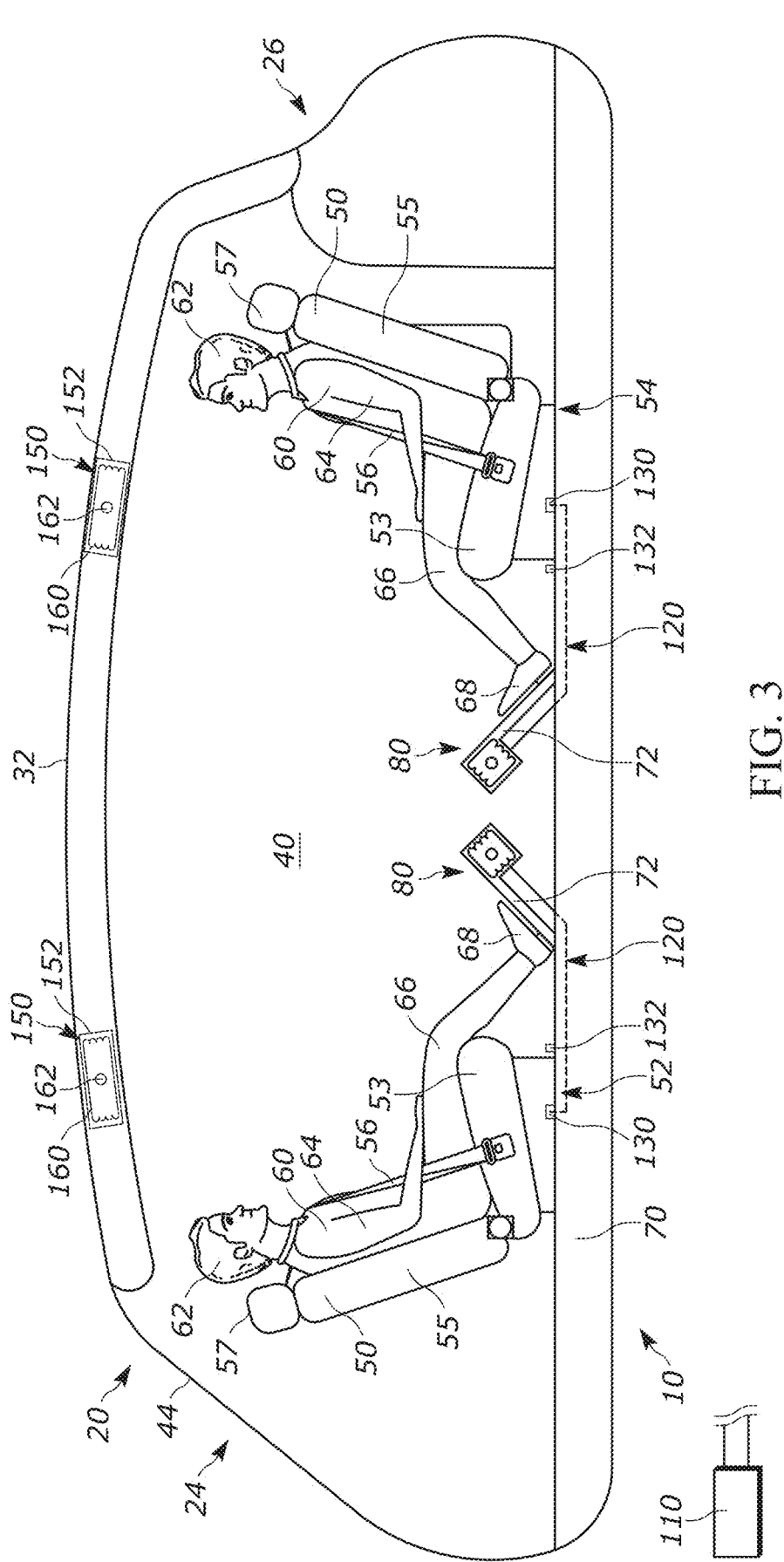
FIG. 3 is a schematic illustration of the vehicle cabin with a second seating arrangement and having the airbags in the stored condition.

Seats 50 are positioned in the cabin 40 and secured to a floor 70 of the vehicle 20. The floor 70 includes a toe board 72 associated with each seat 50. As shown in FIGS. 2-3, the toe board 72 is fixed to the rest of the floor 70 and angled upwards towards the roof 32 and away from its associated seat 50. Each toe board 72 is aligned with its respective seat 50 and positioned in front of the seat. In this open passenger cabin 40 configuration, the vehicle seats 50 can be configured, positioned, and arranged in a variety of manners, not constrained by the need to facilitate a vehicle driver/operator. For example, in FIG. 2, the seats 50 can be oriented in front and rear rows 52 and 54, respectively, arranged in a forward-facing manner similar to that of conventional automobiles. It will be appreciated that the vehicle 20 could alternatively include more or fewer rows of seats 50 (not shown). In any case, a seatbelt 56 is associated with each seat 50 for restraining an occupant 60 in that seat.

For the conventional, forward-facing seating arrangement of FIG. 2, in the event of a frontal crash, the occupants 60 of both the front and rear rows 52, 54 can be restrained by their respective seatbelts 56 (as shown) or unbelted (not shown). Additional restraints are, however, desirable for both head and neck support as well as support for the lower torso (legs/lap/knees). This additional protection is typically provided, at least for the front row 52 occupants 60, at least in part by instrument panel-mounted airbags. In the autonomous vehicle 20 of FIG. 2, however, the instrument panel is removed altogether.

In another seating arrangement shown in FIG. 3, the vehicle 20 includes two rows of seats 50 that face each other, with the front row 52 being rearward-facing and the rear row 54 being forward-facing. More or fewer rows of seats facing in either direction are also contemplated. This unconventional, forward-rearward seating arrangement, in the event of a frontal crash, the occupants 60 of the forward-facing rear row 54 can be restrained by their respective seatbelts 56 (as shown) or unbelted (not shown).

Occupants 60 of the rear-facing front row 52, while buckled, are supported in a frontal crash by the seatbacks of the vehicle seats 50. Because of this, the seats 50 must be constructed to support the occupants 60 in the event of a crash. For the forward-facing occupants 60 in the rear row 54, the seatbelts 56 offer some degree of restraint. It is desirable, however, for both rows 52, 54 to include additional restraints for both head and neck support as well as support for the lower torso.

Regardless of the seating arrangement, each seat 50 includes a base or bottom 53 for receiving the lower torso 66 of the occupant 60. This positions the occupants' feet 68 on or adjacent to the toe board 72. A seatback 55 extends from the base 53 towards the roof 32 and receives an upper torso 64 of the occupant 60. A headrest 57 is connected to the seatback 55 and receives a head 62 of the occupant 60.

In either seating arrangement, since the front row 52 need not face forward and/or need not be in close proximity to the area where an instrument panel would normally reside, there can be a large volume of space between the front row and the forward cabin structure presented facing the front row. That said, it may not be efficient to deploy airbags from this location due to the large volume that the airbags would need to occupy. This would present problems in sizing the airbag(s) and inflator(s) to occupy that large volume, and could also present problems in deploying the airbag(s) into that large volume in the necessary short time required to protect the occupants in a crash scenario.

It is therefore evident that the various passenger seating configurations enabled by autonomous vehicles can present challenges to the conventional concepts of airbag protection. Furthermore, since airbags require structure supporting the deployed airbag against movement in response to occupant penetration (e.g., a reaction surface), the absence of typical vehicle architecture that acts as a reaction surface, such as an instrument panel, presents additional challenges.

To account for these challenges, the occupant restraint system 10 includes at least one vehicle occupant protection device in the form of an inflatable airbag 90 housed/concealed on or in the floor 70 of the vehicle 20. More particularly, in the example configuration of FIGS. 2 and 3, the airbags 90 are mounted on each of the toe boards 72 associated with the front row 52 and each toe board associated with the rear row 54.

Mounting the airbags 90 in the area of the floor 70 allows for rapid deployment into a position extending laterally across the width (the lateral direction of the vehicle 20) of the seat 50 in front of the occupant 60. The airbags 90 can be configured to deploy from their mounting locations inboard and/or outboard, depending on factors such as the architecture of the vehicle 20 and the resulting space through which the airbags can deploy. In any case, mounting the airbags 90 in the area of the floor 70 is also convenient because the airbags can be positioned in a location with a desired proximity to the occupant(s) 60 they are intended to help protect. This can help reduce the necessary inflatable volume of the airbags 90 and can also help provide a desired deployment time without requiring an excessively high-volume inflator.

The airbag 90 is stored in a module 80 (hereafter a "floor module") having a housing 82. The airbag 90 is at least one of rolled and folded before being placed in the housing 82 of the floor module 80. The floor module 80 is then placed on the floor 70 by securing the module to the toe board 72.

In the example configurations of FIGS. 2 and 3, the floor modules 80 are mounted on a free end of the toe board 72 such that the cabin-facing top surfaces of the floor module and toe board are co-planar/substantially co-planar. This is just one example of how the mounting can be accomplished. Of course, each mounting location brings different challenges in terms of configuring the floor modules 80. These challenges and their respective solutions will become apparent in the paragraphs that follow.

An inflator 92 is also positioned in each floor module 80 for providing inflation fluid to each airbag 90. The inflators 92 are operatively connected (e.g., by wires) to an airbag controller 110 (see FIG. 2) that includes or communicates with one or more crash sensors (not shown). The airbag controller 110 is operative to determine the occurrence of a crash event and to actuate the inflators 74 in a known manner to inflate the airbags 90. The inflators 74 can be of any known type, such as stored gas, solid propellant, augmented or hybrid.

The airbag 90 can be constructed of any suitable material, such as nylon (e.g., woven nylon 6-6 yarns), and may be constructed in any suitable manner. For example, the airbag 90 may include one or more pieces or panels of material. If more than one piece or panel is used, the pieces or panels can be interconnected by known means, such as stitching, ultrasonic welding, heat bonding, or adhesives, to form the airbag 90. The airbag 90 can be uncoated, coated with a material, such as a gas impermeable urethane, or laminated with a material, such as a gas impermeable film. The airbag 90 can therefore have a gas-tight or substantially gas-tight construction. Those skilled in the art will appreciate that alternative materials, such as polyester yarn, and alternatives coatings, such as silicone, may also be used to construct the airbag 90.

The occupant restraint system 10 can include multiple airbags 90 provided on the floor 70 adjacent each seat 50 in each row 52, 54. In other words, each seat 50 in the vehicle 20 can have an individual floor module 80 (with corresponding airbag 90 and inflator 92) associated therewith. Alternatively, a single floor module 80 and, thus, a single airbag 90 and inflator 92 can be associated with an entire row 52 or 54 of seats 50 (not shown).

Regardless, in FIG. 2, each airbag 90 is positioned in the floor 70 in front of the associated seat 50 (i.e., forward of the seats 50 in the front row 52 and forward of the seats in the rear row 54). In FIG. 3, the airbags 90 are positioned rearward of the seats 50 in the front row 52 and forward of the seats in the rear row 54, respectively. Although the airbags 90 within the floor 70 are identical for each row provided in the vehicle 20, the construction and operation of only the airbag associated with a seat 50 in the rear row 54 is discussed for brevity for the seating arrangement shown in FIG. 2.

To further account for aforementioned occupant 60 protection challenges, the occupant restraint system 10 further includes at least one vehicle occupant protection device in the form of an inflatable airbag 160 housed/concealed on or in the roof 32 of the vehicle 20. In particular, additional airbag modules 150 (hereafter a "roof module") are provided in the roof of the vehicle 20 in a position aligned with each occupant 60 in the forward-rearward direction. The roof module 150 is positioned in front of the occupant 60 relative to the direction in which the occupant faces.

Similar to the floor module 80, the roof module 150 includes a housing 152 that encloses/stores an airbag 160. More specifically, the airbag 160 is at least one of rolled and folded before being placed in the housing 152 of the roof module 150. The airbag 160 can generally have the same construction as the airbag 90, although the shapes of the airbags 90, 160 are different to accommodate the different respective portions of the occupant 60 in a manner tailored to the geometry of the cabin 40 and/or seats 50, as will be discussed.

An inflator 162 is positioned in each roof module 160 for providing inflation fluid to each airbag 160. The inflators 162 are operatively connected to the airbag controller 110. It will be appreciated that the airbag controller 110 can be the same or different from the airbag controller 110 associated with the floor modules 80. In any case, the airbag controller 110 includes or communicates with the one or more crash sensors (not shown) and is operative to determine the occurrence of a crash event and to actuate the inflators 162 in a known manner to inflate the airbags 160. The inflators 160 can be of any known type, such as stored gas, solid propellant, augmented or hybrid.

The occupant restraint system 10 can include multiple airbags 160 provided in the roof 32 adjacent each seat 50 in each row 52, 54. In other words, each seat 50 in the vehicle 20 can have an individual roof module 160 (with corresponding airbag 160 and inflator 162) associated therewith. Alternatively, a single roof module 150 and, thus, a single airbag 160 and inflator 162 can be associated with an entire row 52 or 54 of seats 50 (not shown).

In FIG. 2, each airbag 160 is positioned in the roof 32 in front of the associated seat 50 (i.e., forward of the seats 50 in the front row 52 and forward of the seats in the rear row 54). In FIG. 3, the airbags 160 are positioned rearward of the seats 50 in the front row 52 and forward of the seats in the rear row 54, respectively. Although the airbags 160 within the roof 32 are identical for each row provided in the vehicle 20, the construction and operation of only the airbag associated with a seat 50 in the rear row 54 is discussed for brevity for the seating arrangement shown in FIG. 2.

Mounting the airbags 160 in the area of the roof 32 allows for rapid deployment into a position extending laterally across the width (the lateral direction of the vehicle 20) of the seat 50 in front of the occupant 60. The airbags 160 can be configured to deploy from their mounting locations inboard and/or outboard, depending on factors such as the architecture of the vehicle 20 and the resulting space through which the airbags can deploy. In any case, mounting the airbags 160 in the area of the roof 32 is also convenient because the airbags can be positioned in a location with a desired proximity to the occupant(s) 60 they are intended to help protect. This can help reduce the necessary inflatable volume of the airbags 90 and can also help provide a desired deployment time without requiring an excessively high-volume inflator.

As shown in FIG. 2, upon sensing the occurrence of an event for which inflation of the airbags 90, 160 is desired, such as a vehicle collision, the controller 110 provides signals to the inflators 92, 162. Upon receiving the signals from the controller 110, the inflator 92 is actuated and provides inflation fluid to the inflatable volume of the airbag 90 in a known manner. The inflating airbag 90 exerts a force on the housing 82, which causes the housing and the floor 70 to open (e.g., via tear seam or door). This releases the airbag 90 to inflate and deploy from its stored condition in the module 80 on the floor 70 to a deployed condition extending into the cabin 40 forward of and aligned with (e.g., in the forward-rearward direction of the vehicle 20) the seat 50 in the front row 52. In particular, the airbag 90 inflates in the lateral direction of the vehicle 20 across the width of the seat 50 so as to be aligned with the occupant 60 in the seat. The airbag 90, while inflated, helps protect the lower torso 66 of the vehicle occupant 60 in the front row 52 by absorbing the impact of the occupant.

Figure 4A:
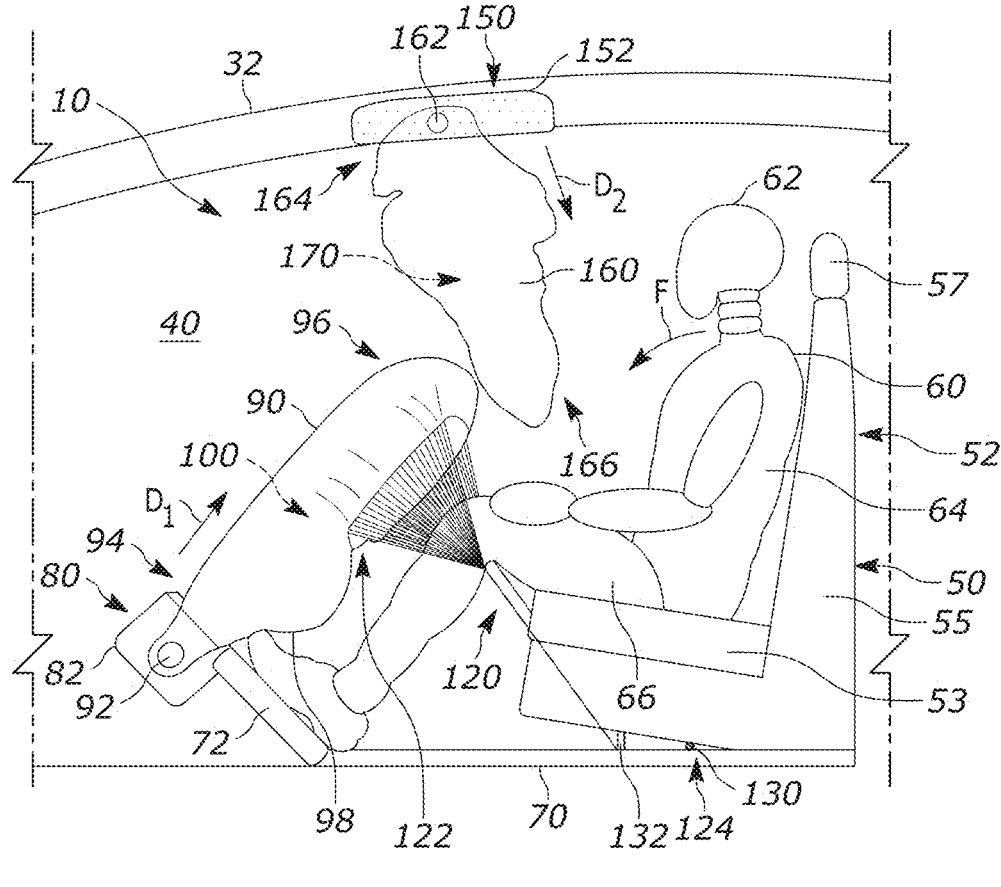
FIG. 4A is a schematic illustration of a front row of the cabin with the airbags in a first stage of deployment.

In particular, and referring to FIG. 4A, the airbag 90 inflates from its stored locations on the floor 70 to its deployed condition. The airbag 90, when deployed, extends from a lower end 94 to an upper end 96 and defines an inflatable volume 100. The lower end 94 is connected to the vehicle 20 and fluidly connected to the inflator 92. The upper end 96 is positioned adjacent to the occupant 60 in the front row 52. A portion 98 of the airbag 90 extends rearward and downward relative to the rest of the airbag.

In its deployed condition, the airbag 90 is configured to extend across the width of the seat 50 in front of the occupant 60 and upward from the floor 70 to a position sufficient to receive and help protect the occupant's lower torso 66. In one example, the lower end 94 extends rearward and upward away from the toe board 72 generally towards the occupant's upper torso 64 but terminates prior to reaching the upper torso. In this manner, the airbag 90 can help to inhibit the lower torso 66 from extending and help prevent injuries, such as hyperextension.

The extent of the airbag 90 deployment vertically and/or horizontally (as shown in FIG. 4A) can be adjusted in order to adjust the coverage of the airbags. To this end, the airbag 90 can be configured to extend further inboard and/or outboard in order to help protect the occupant 60 in the event of an oblique or offset collision. The inflated depth of the airbag 90 (in the direction of the centerline 22) can also be adjusted.

As noted, there is no vehicle structure in position to act as a reaction surface to constrain movement of the deployed airbag 90. That said, tethers 120 support the airbag 90 against movement in response to occupant penetration. More specifically, the tethers 120 replace the reaction surface typically required for frontal passenger airbags. To this end, a pair of tethers 120 can be provided for each airbag 90 on the inboard and outboard sides thereof on opposite sides of the seat 50 and therefore on opposite sides of the occupant 60. Alternatively, a single tether 120 can extend around the front (forward-facing as shown) of the airbag 90 and rearward to both the inboard and outboard sides of the seat 50 (not shown).

The tethers 120 extend from first ends 122 connected to the inboard and outboard sides, respectively, of the airbag 90 to second ends 124. The first ends 122 can constitute or include a stress reducer for spreading the connection between the tethers 120 and the airbags 90 over a large surface of the airbag fabric so as to prevent tearing. The second ends 124 extend to positions laterally of the associated seat 50 and occupant 60 and adjacent to the floor 70. The second ends 124 could extend to locations other than the illustrated floor 70 locations. For example, the second ends 124 could terminate in the vehicle seats 50 (e.g., in the seat base 53 or seatback 55 (not shown)).

When a single tether 120 is used, the first end 122 constitutes the portion extending around the airbag 90 and the second end 124 constitutes the two free ends of the single tether positioned on opposite lateral sides of the seat 50 (not shown).

Regardless of the exact location of the second end 124 in the vehicle 20, each second end is secured to an actuation unit 130 for controlling the tension on the tether 120. As shown, the actuation units 130 are secured to the floor 70, but could alternatively be provided in/on the seat 50 (not shown). The actuation units 130 can constitute, for example, linear actuators. One or more guide elements 132, such as looped fasteners or tubular structures, can be provided on the floor 70 (or the seat 50 depending on the location of the actuation units 130) for receiving the tethers 120 in order to guide the second ends 124 to the respective actuation unit. The guide elements 132 are located on opposite sides of the seat 50 and can be positioned closer to the forward end of the seat.

The actuation unit 130 is connected to the controller 110 in a manner that enables the controller to control actuation thereof. The actuation units 130 are actuated by the controller 110 to increase the tension on the tethers 120 as the airbag 90 deploys towards the occupant 60 in order to position the deployed airbag 90 in a desired manner relative to the occupant.

In particular, upon actuation of the inflator 92, the airbag 90 deploys generally in the rearward and upward direction in the vehicle 20 (indicated at Di in FIG. 4A). The fully deployed airbag 90, however, may be spaced from the lower torso 66 of the occupant 60, which can reduce the degree to which the airbag can help protect the occupant during a vehicle crash. That said, at a predetermined time during deployment of the airbag 90, the controller 110 actuates the actuation units 130 connected to the second ends 124 of the tethers 120. In response, the actuation units 130 move rearward in the vehicle 20 (indicated at R in FIG. 4B). This causes the second ends 124 of the tethers 120 to likewise move rearward in the vehicle 20 in the manner R. Movement of the second ends 124 in the manner R is guided by the guide elements 132.

Since the first ends 122 of the tethers 120 are secured to the airbag 90, moving the second ends 124 rearward causes the tethers to tension and pull the airbag 90 rearward toward the occupant's lower torso 66. More specifically, as the actuation units 130 move rearward in the manner R, the airbag 90 is pulled/pivoted about its lower end 94 in the manner P (clockwise as shown) downward and rearward into engagement with the lower torso 66. This also causes the portion 98 to move into engagement with the feet 68 of the occupant 60. The feet 68 are therefore positioned between and engage both the toe board 72 and the portion 98 of the airbag 90.

It will be appreciated that as shown the actuation units 130 have a first, retracted condition prior to airbag 90 deployment and are actuatable (in this case movable in the rearward direction R) to a second, extended condition during airbag deployment. The actuation units 130 can, however, be instead configured to have a first, extended condition prior to airbag 90 deployment and be actuatable to a second, retracted condition during airbag deployment.

Figure 4B:
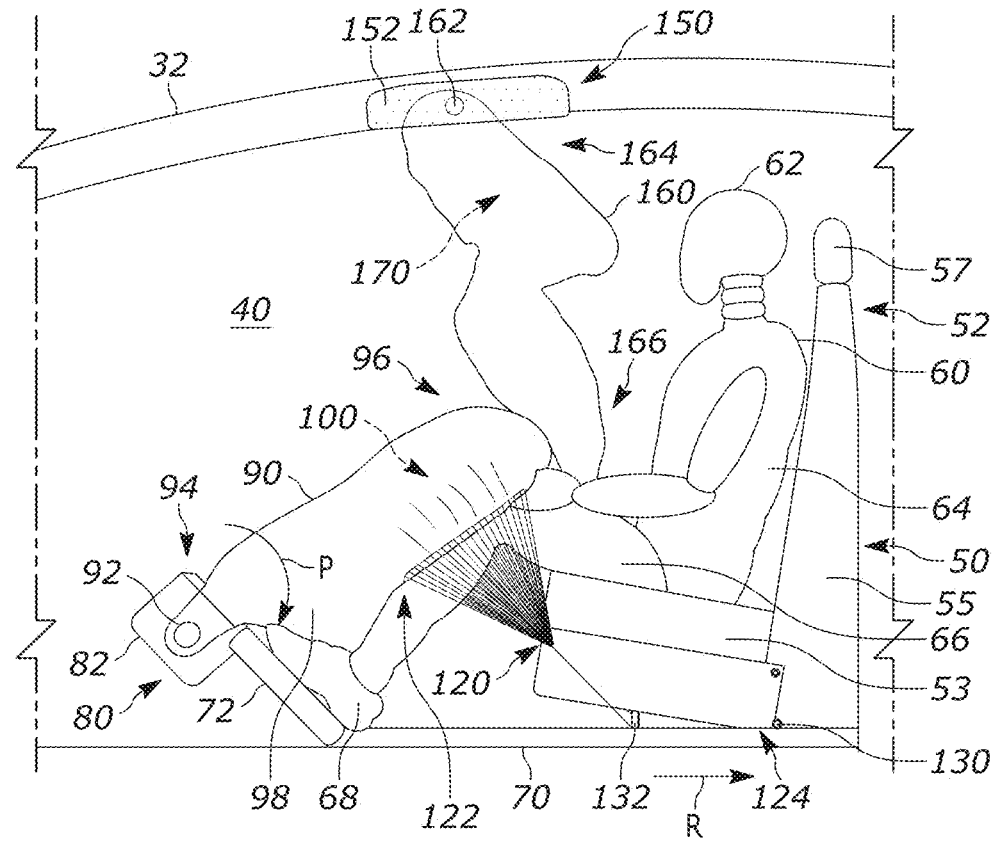
FIG. 4B is a schematic illustration of the front row of the cabin with the airbags in a second stage of deployment and the floor-mounted airbag being pulled towards the occupant.

In any case, while the inflator 92 is actuated by the controller 110 to deploy the airbag 90 from the floor module 80, the controller also actuated the inflator 162 to deploy the airbag 160 from the roof module 150. As shown in FIGS. 4A-4B, the airbag 160 inflates from its stored location in the roof 32 to its deployed condition. The airbag 160, when deployed, extends from an upper end 164 to a lower end 166 and defines an inflatable volume 170. The upper end 164 is connected to the vehicle 20 and fluidly connected to the inflator 162. The lower end 166 is positioned adjacent the occupant 60 in the front row 52.

In its deployed condition, the airbag 160 is configured to extend across the width of the seat 50 in front of the occupant 60 and downward from the roof 32 to a position sufficient to receive and help protect the occupant's head 62 and upper torso 64. The lower end 166 of the airbag 160 is configured to deploy to a position between (rearward as shown) and aligned with (the forward-rearward direction as shown) the upper end 96 of the airbag 60 and the upper torso 64. In any case, the airbag 160 can inhibit the upper torso 64 from moving forward in the vehicle 20 and thereby help prevent injuries.

The extent of the airbag 160 deployment vertically and/or horizontally (as shown in FIG. 4) can be adjusted in order to adjust the coverage of the airbags. To this end, the airbag 160 can be configured to extend further inboard and/or outboard in order to help protect the occupant 60 in the event of an oblique or offset collision. The inflated depth of the airbag 160 (in the direction of the centerline 22) can also be adjusted.

Figure 4C:
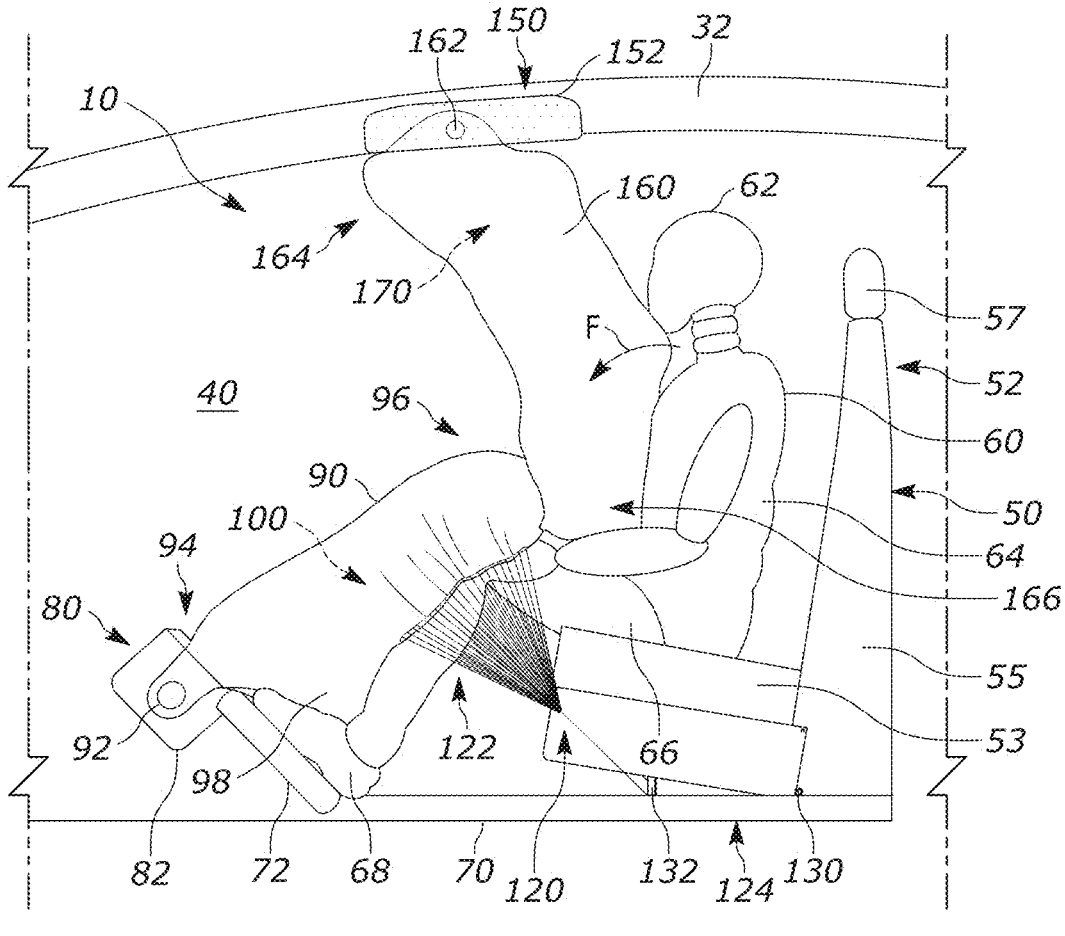
FIG. 4C is a schematic illustration of the front row of the cabin during occupant penetration into the deployed airbags.

When the occupant 60 is unbelted, a frontal crash resulting in forward occupant movement causes the occupant to bend at the waist and follow an angled or arcuate path toward the airbags 90, 160, as indicated generally by the arrow F in FIG. 4C. Once the moving occupant 60 engages/penetrates the airbags 90, 160, the airbags are urged to move in the direction F. Both airbags 90, 160—alone and in combination—are configured to provide reaction surfaces to help prevent the occupant 60 from moving in the direction F.

Figure 5:
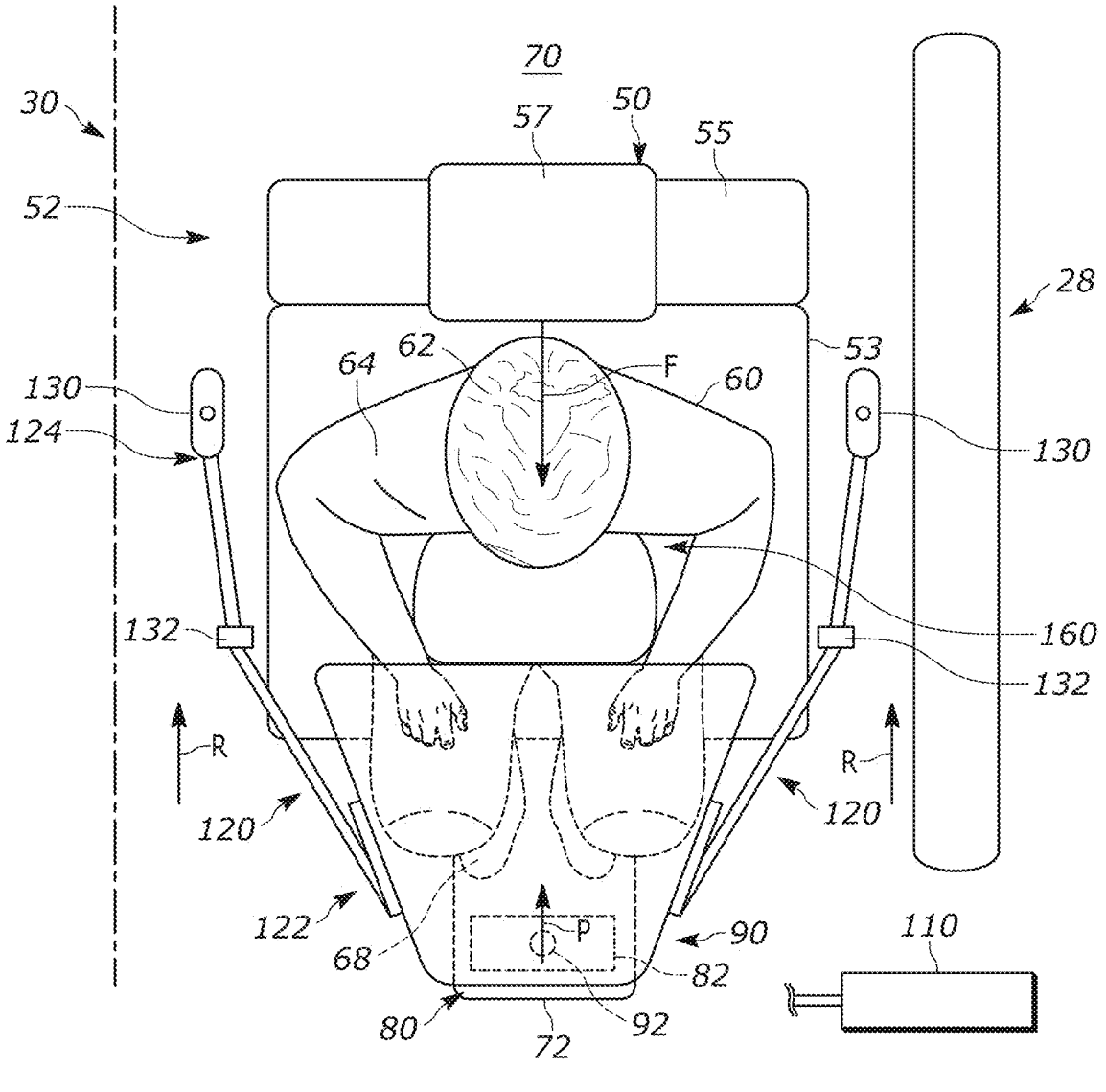
FIG. 5 is a top view of the restraint system of FIG. 4C.

To this end, as shown in FIG. 4C-5, the locations of the second end 124/floor 70 connections can be selected such that the tension the tethers 120 apply to the airbag 90 can be opposite the impact forces applied to the airbag 90 by the penetrating occupant 60. For example, the tethers 120 can pull the airbag 90 rearward in the vehicle 20 while the penetrating occupant 60 attempts to push the airbag forward in the vehicle. As a result, the floor 70, through the tethers 120, acts as the reaction surface for the airbag 90. The airbag 90 therefore provides a gradual, ride-down effect on the moving occupant 60 to thereby help reduce loads thereon. The example configuration of FIGS. 1-5 therefore requires no interaction with forward structure of the vehicle 20, such as an instrument panel, steering wheel, or seat, to provide a reaction surface for the airbag 90.

At the same time, by positioning the lower end 166 of the airbag 160 rearward of and aligned with the upper end 96 of the airbag 90, the lower end 166 relies on the upper end 96 to act as a reaction surface for the penetrating occupant. In this manner, the tethers 120 also help to provide a reaction surface for the airbag 160 as the occupant 60 moves forward in the manner F. More specifically, movement of the lower end 166 of the airbag 160 away from the penetrating occupant 60 is resisted due to the tethers 120 providing tension on the upper end 96 of the airbag 90 in the rearward direction.

Additionally, fixing the upper end 164 of the airbag 160 to the roof 32 enables the roof to provide an additional reaction surface for the airbag 160. In this manner, the airbags 90, 160 operate independently and cooperatively to resist movement of the airbags in the manner F in response to occupant penetration.

Figure 6A:
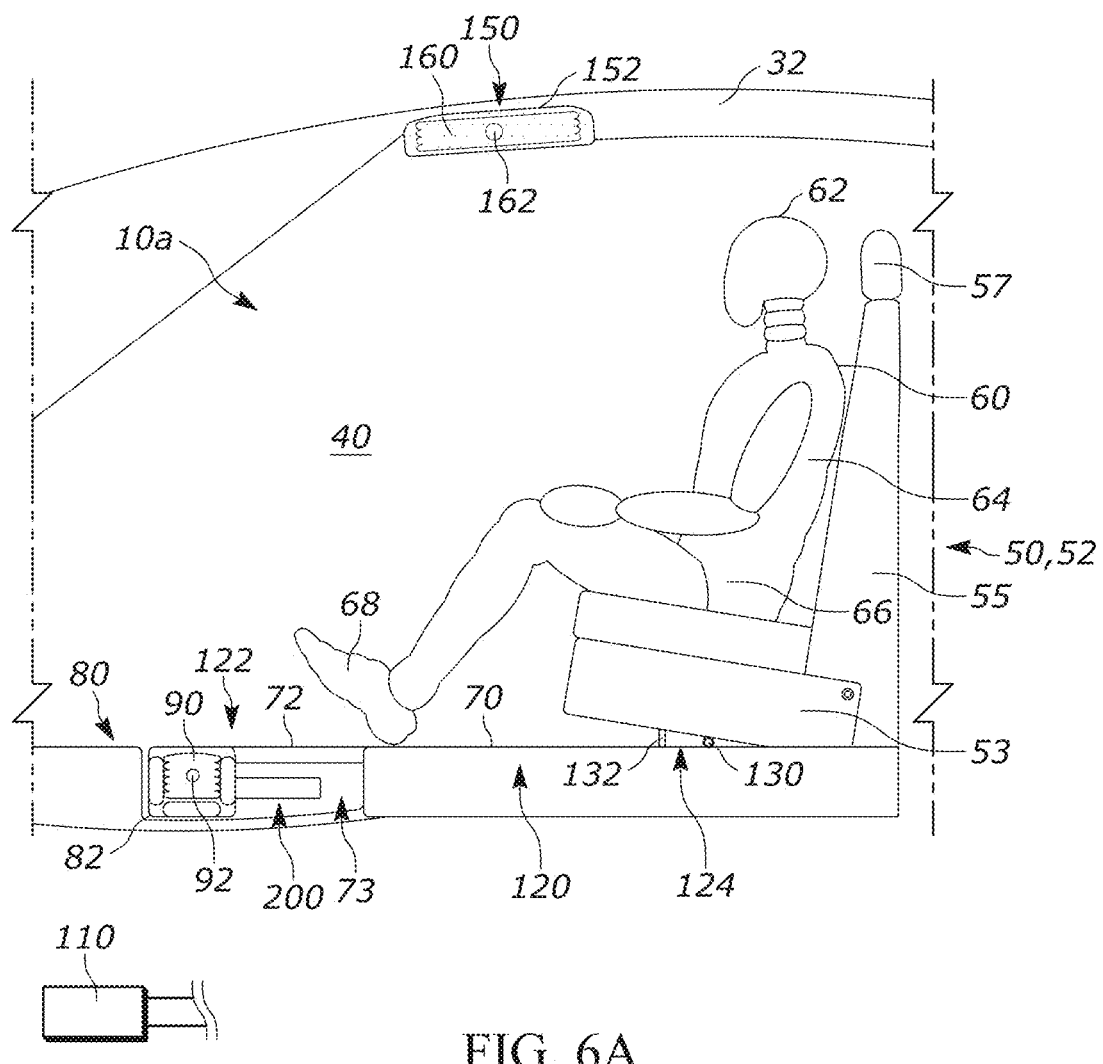
FIG. 6A is a schematic illustration of a front row of the cabin with another example occupant restraint system having floor-mounted and roof-mounted airbags.
Figure 6B:
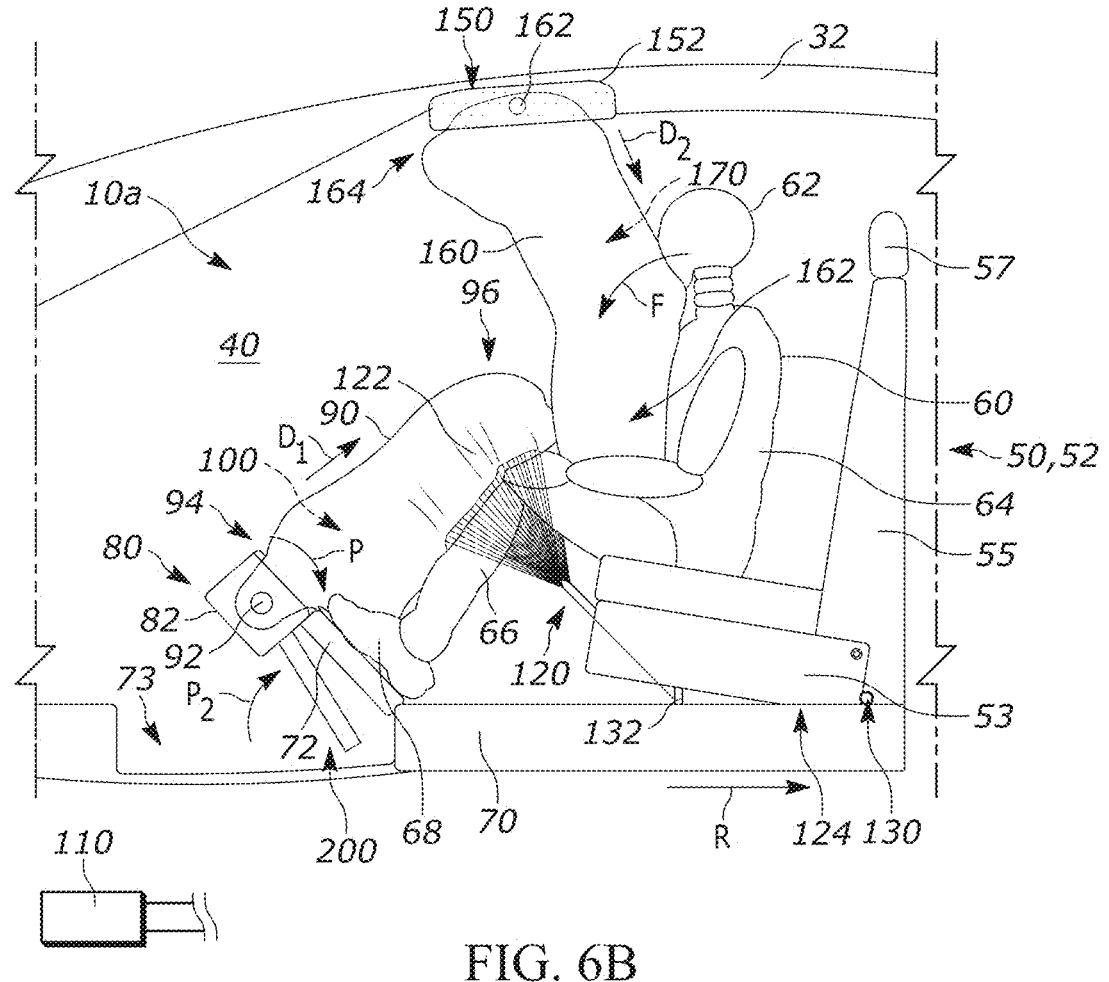
FIG. 6B is a schematic illustration of the front row of the cabin of FIG. 6A with the airbags deployed.

FIGS. 6A-6B illustrate another example configuration of the occupant restraint system 10a. In FIGS. 6A-6B, the floor modules 80 are mounted in a recess or pocket 73 in the floor 70 so that the upper extent of the housing 82 is flush with or recessed within the floor surface so as to be hidden and not intrude upon occupant 60 movement in the cabin 40. To this end, the toe board 72 and the floor module 80 are substantially co-planar with the cabin-facing surface of the floor 70. In this manner, the floor module 80 and toe board 72 help to define a portion of the floor 70.

The occupant restraint system 10a includes an actuator 200 connected to the floor 70 and the floor module 80. The actuator 200 is connected to the controller 110 and has a first, unactuated condition concealed within the recess 73 such that the floor module 80 and toe board 72 are retracted within the floor 70.

As shown in FIG. 6B, upon sensing the occurrence of an event for which inflation of the airbags 90, 160 is desired, such as a vehicle collision, the controller 110 provides a signal to the actuator 200. In response to receiving the signal from the controller 110, the actuator 200 transitions to a second, actuated condition extending out of the recess 73 and into the cabin 40. More specifically, the actuator 200 pivots upward into the cabin 40 in the manner $P_2$. As a result, the toe board 72 and floor module 80 connected to the actuator 200 likewise pivot upward in the manner $P_2$. The floor module 80 is pivoted upward to a position identical or substantially identical to the position shown in FIG. 4A (in which the toe board 72 has a fixed position relative to the floor 70).

At the same time or immediately thereafter, the controller 110 also provides signals to the inflators 92, 162 and the actuating unit 130 in the same manner as described above with respect to the occupant restraint system 10. That said, the inflators 92, 162 are actuated and provide inflation fluid to the respective inflatable volumes 100, 170 of the airbags 90, 160 in a known manner, while the actuating unit 130 moves rearward in the direction R to pull the airbag 90 towards and into engagement with the occupant's lower torso 66 in the manner P. This causes the airbags 90, 160 to deploy to the positions shown in FIG. 6B and thereby act individually and cooperatively to provide reaction surfaces for the penetrating occupant 60. In other words, once the actuator 200 moves the floor module 80 into the position shown in FIG. 6B, the occupant restraint system 10*a* operates in the same manner as the occupant restraint system 10 in order to help protect the occupant 60 with a combination of the deployed airbags 90, 160.

Figure 7:
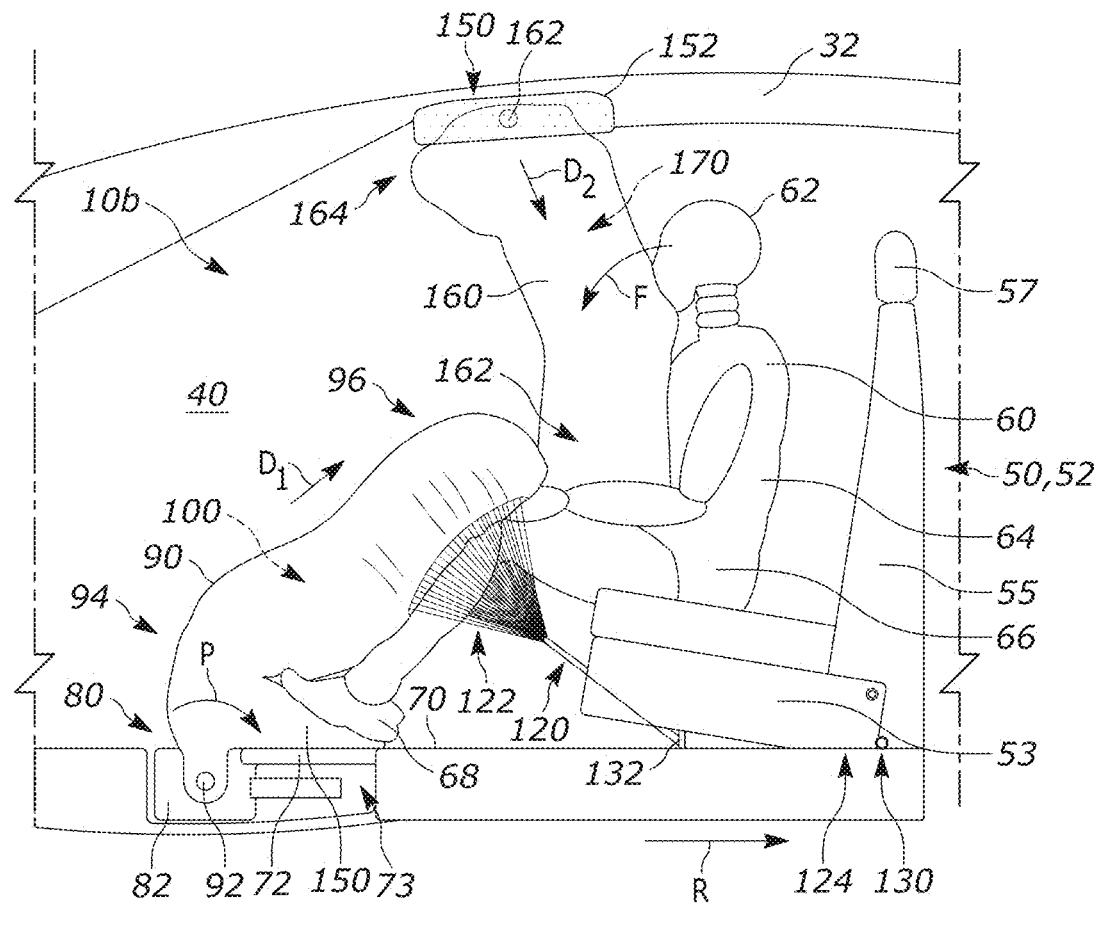
FIG. 7 is a schematic illustration of a front row of the cabin with another example occupant restraint system.

FIG. 7 illustrates another example configuration of the occupant restraint system 10*b*. In FIG. 7, the floor modules 80 are again mounted in the recess or pocket 73 in the floor 70 so that the upper extent of the toe board 72/housing 82 are flush with or recessed within the floor surface. Instead of pivoting the floor module 80 for airbag 90 deployment, however, the airbag 90 is configured to occupy the space between the occupant's foot 68 and the floor 70 where the pivoted toe board 72 would reside.

In particular, the airbag 90 includes a projection or wedge-shaped portion 150 configured to deploy to a position extending between the occupant's feet 68 and the floor 70. In this manner, the deployed portion 150 resembles a toe board 72. With this in mind, upon sensing the occurrence of an event for which inflation of the airbags 90, 160 is desired, such as a vehicle collision, the controller 110 provides signal to the inflators 92, 162. In response to receiving the signal from the controller 110, the inflators 92, 162 are actuated and provide inflation fluid to the respective inflatable volumes 100, 170 of the airbags 90, 160 in a known manner, while the actuating unit 130 moves rearward in the direction R to pull the airbag 90 in the manner P towards and into engagement with the occupant's lower torso 66.

As the airbag 90 deploys in the direction Di, the wedge-shaped portion 150 inflates between and engages both the occupant's feet 68 and the floor 70. The actuations units 130 pulling the airbag 90 in the manner P helps position the portion 150 at this location. The portion 150 is angled such that, when fully deployed, the shape and position of the portion resembles the shape and position of the toe board 72 (whether in the fixed position shown in FIG. 4A or in the pivoted position shown in FIG. 6B). Once the portion 150 is located, the airbag 90 cooperates with the airbag 160 to help protect the occupant 60 in the same manner described above, namely, by individually and cooperatively providing reaction surfaces for the penetrating occupant 60.

The airbags 90 of FIGS. 1-7 can include the tethers 120 while at the same time having a variety of configurations. For example, the airbags 90 and/or the airbag 160 can include internal tethers (not shown) for helping to shape or otherwise control their inflated configurations. Such tethers could, for example, create pockets or areas of reduced surface tension for improving occupant protection, such as by providing an enhanced degree of cushioning for the occupant's upper torso and/or head.

From the above, it will be appreciated that the example configurations of FIGS. 1-7 illustrate that the airbags 90 are configured to utilize the vehicle floor 70 as a reaction surface regardless of whether the seats are in the conventional seating arrangement (FIG. 2) or the unconventional seating arrangement (FIG. 3). By "reaction surface," it is meant that it is the vehicle floor 70 that support their respective airbags against movement in response to an impacting occupant(s) 60. This allows the airbags to absorb impact forces of the occupants 60 and provide the desired ride-down effect. Advantageously, the example configurations can rely only the vehicle floor 70 to provide the reaction surface and can provide effective occupant protection without requiring any support from structure other than the seats. The vehicle floor 70 can thereby support the floor modules 80 and the airbags 90 entirely.

Additionally, mounting each of the airbag modules in the vehicle floor 70 allows the airbags to be tasked with protecting only a certain occupant or occupants. For example, the airbag modules can be mounted to protect occupants on a seat-by-seat basis. This also allows for versatility in seating configurations, as the modules can be mounted relative to virtually any seating location and orientation.

Moreover, deploying the roof-mounted airbag between the floor-mounted airbag and the occupant's upper torso and head allows both the floor-mounted airbag and roof to provide a reaction surface for the roof-mounted airbag to the penetrating occupant. Consequently, the deployed, roof-mounted airbag requires no interaction with forward structure of the vehicle, such as an instrument panel, steering wheel, or seat, to provide a reaction surface for the roof-mounted airbag.

What have been described above are examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims. To this end, it will also be appreciated that features shown and illustrated in any one example can likewise be added to/interchanged with features in any other example.

We claim:

1. A restraint system for helping to protect an occupant of a vehicle having a floor, a roof, and a cabin with a seat for the occupant, comprising:

a first airbag having a stored condition on the vehicle floor and being inflatable to a deployed condition aligned with the occupant in a forward-rearward direction of the vehicle and configured to receive a lower torso of the occupant penetrating into the first airbag;

at least one tether having a first end connected to the first airbag and a second end connected to the vehicle floor for transmitting energy of the occupant penetrating the first airbag to the vehicle floor;

at least one actuation unit for connecting the second end of each tether to the floor, the actuation unit being actuatable during deployment of the first airbag to tension each tether for pulling the first airbag towards the lower torso of the occupant; and a second airbag inflatable from the roof and configured to receive an upper torso of the occupant, wherein the first and second airbags are configured such that an upper end of the first airbag engages a lower end of the second airbag so that the lower end of the second airbag is positioned between the occupant and the upper end of the first airbag so that the first airbag is a reaction surface for supporting the second airbag against penetration of the occupant into the second airbag.

2. The restraint system recited in claim 1, wherein the at least one actuation unit is actuatable to move in a direction away from the first airbag for pulling the first airbag towards the lower torso.

3. The restraint system recited in claim 1, wherein the at least one actuation unit comprises a linear actuator having a first, retracted condition prior to first airbag deployment and being actuatable to a second, extended condition during first airbag deployment.

4. The restraint system recited in claim 1, wherein the at least one actuation unit comprises a linear actuator having a first, extended condition prior to first airbag deployment and being actuatable to a second, retracted condition during first airbag deployment.

5. The restraint system recited in claim 1, wherein the at least one tether comprises first and second tethers, and wherein the system further comprises first and second actuation units, each of the first and second tethers having the first end connected to the first airbag and the second end connected to the respective first and second actuation units for transmitting the energy of the occupant penetrating the first airbag to the vehicle floor.

6. The restraint system recited in claim 5, wherein the first and second actuation units are positioned on opposite sides of the seat.

7. The restraint system recited in claim 1, wherein the floor includes a toe board and the first airbag is configured to deploy upwards and away from the toe board.

8. The restraint system recited in claim 1, wherein the first airbag includes a portion configured to extend between feet of the occupant and the floor when the first airbag is deployed.

9. The restraint system recited in claim 1, further comprising a controller for controlling actuation of the at least one actuation unit and deployment of the first airbag.

10. An airbag module comprising the restraint system of claim 1 and further comprising a housing configured to be mounted in the vehicle floor for storing the first airbag and an inflator positioned within the housing for providing inflation fluid for inflating the first airbag.

11. The restraint system recited in claim 1, wherein the first and second airbags are configured so that engagement of the lower end of the second airbag with the upper end of the first airbag causes the at least one tether to support the second airbag against movement away from the seat in response to the occupant penetrating the second airbag.

12. The restraint system recited in claim 1, wherein the at least one tether is configured to apply tension to the upper end of the first airbag, the tension being configured to support the second airbag against movement away from the seat in response to the occupant penetrating the second airbag.

13. The restraint system recited in claim 1, further comprising at least one guide element provided on the floor for guiding each tether to each respective actuation unit.

14. The restraint system recited in claim 1, wherein the floor includes a toe board and the first airbag is configured to deploy upwards and away from the toe board, and wherein the restraint system further comprises an actuator for pivoting the first airbag from a first position within the floor prior to deployment to a second position located above the floor prior to actuation of the at least one actuation unit.

15. A restraint system for helping to protect an occupant of a vehicle having a floor, a roof, and a cabin with a seat for the occupant, comprising:

an airbag having a stored condition on the vehicle floor and being inflatable to a deployed condition aligned with the occupant in a forward-rearward direction of the vehicle and configured to receive a lower torso of the occupant penetrating into the airbag;

at least one tether having a first end connected to the airbag and a second end connected to the vehicle floor for transmitting energy of the occupant penetrating the airbag to the vehicle floor;

at least one actuation unit for connecting the second end of each tether to the floor, the actuation unit being actuatable during deployment of the airbag to tension each tether for pulling the airbag towards the lower torso of the occupant; and at least one guide element provided on the floor for guiding each tether to each respective actuation unit.

16. A restraint system for helping to protect an occupant of a vehicle having a floor, a roof, and a cabin with a seat for the occupant, comprising:

an airbag having a stored condition on the vehicle floor and being inflatable to a deployed condition aligned with the occupant in a forward-rearward direction of the vehicle and configured to receive a lower torso of the occupant penetrating into the airbag;

at least one tether having a first end connected to the airbag and a second end connected to the vehicle floor for transmitting energy of the occupant penetrating the airbag to the vehicle floor;

at least one actuation unit for connecting the second end of each tether to the floor, the actuation unit being actuatable during deployment of the airbag to tension each tether for pulling the airbag towards the lower torso of the occupant;

wherein the floor includes a toe board and the airbag is configured to deploy upwards and away from the toe board; and wherein the restraint system further comprises an actuator for pivoting the airbag from a first position within the floor prior to deployment to a second position located above the floor prior to actuation of the at least one actuation unit.

17. A restraint system for helping to protect an occupant of a vehicle having a floor, a roof, and a cabin with a seat for the occupant, comprising:

a first airbag having a stored condition on the vehicle floor and being inflatable to a deployed condition aligned with the occupant in a forward-rearward direction of the vehicle and configured to receive a lower torso of the occupant penetrating into the first airbag;

first and second tethers each having a first end connected to the first airbag and a second end connected to the vehicle floor for transmitting energy of the occupant penetrating the first airbag to the vehicle floor;

first and second actuation units for connecting the second ends of the first and second tethers to the floor, the first and second actuation units being actuatable during deployment of the first airbag to tension each tether for pulling the first airbag towards the lower torso of the occupant; and a second airbag having a stored condition in the roof of the vehicle and being inflatable to a deployed condition in which a lower end of the second airbag is positioned between an upper end of the first airbag and the occupant such that the first airbag is a reaction surface for the second airbag.

18. The restraint system recited in claim 17, wherein the first and second actuation units are actuatable to move in a direction away from the first airbag for pulling the first airbag towards the lower torso.

19. The restraint system recited in claim 17, wherein each actuation unit comprises a linear actuator having a first, retracted condition prior to first airbag deployment and being actuatable to a second, extended condition during first airbag deployment.

20. The restraint system recited in claim 17, further comprising guide elements provided on the floor for guiding each first and second tether to each respective first and second actuation unit.

21. The restraint system recited in claim 17, wherein the floor includes a toe board and the first airbag is configured to deploy upwards and away from the toe board.

22. The restraint system recited in claim 21, further comprising an actuator for pivoting the first airbag from a first position within the floor prior to deployment to a second position located above the floor prior to actuation of the actuation units.

23. The restraint system recited in claim 17, wherein the first airbag includes a portion configured to extend between feet of the occupant and the floor when the first airbag is deployed.

24. An airbag module comprising the restraint system of claim 17, and further comprising a housing configured to be mounted on the vehicle floor for storing the first airbag and an inflator positioned within the housing for providing inflation fluid for inflating the first airbag.

* * * * *